US008319969B2

(12) United States Patent
Clark et al.

(10) Patent No.: US 8,319,969 B2
(45) Date of Patent: Nov. 27, 2012

(54) COLOR DETECTOR HAVING AREA SCALED PHOTODETECTORS

(75) Inventors: Stephan R. Clark, Albany, OR (US); Andrew L. VanBrocklin, Corvallis, OR (US); Brett E. Dahlgren, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 12/865,392

(22) PCT Filed: Feb. 13, 2008

(86) PCT No.: PCT/US2008/053826
§ 371 (c)(1),
(2), (4) Date: Jul. 29, 2010

(87) PCT Pub. No.: WO2009/102328
PCT Pub. Date: Aug. 20, 2009

(65) Prior Publication Data
US 2010/0321694 A1 Dec. 23, 2010

(51) Int. Cl.
*G01N 21/25* (2006.01)
(52) U.S. Cl. ........................................................ 356/419
(58) Field of Classification Search .................. None
See application file for complete search history.

(56) References Cited

U.S. PATENT DOCUMENTS

| 5,144,498 | A | 9/1992 | Vincent |
| 5,272,518 | A | 12/1993 | Vincent |
| 5,359,615 | A | 10/1994 | Sasaki et al. |
| 5,428,635 | A | 6/1995 | Zhiglinsky et al. |
| 5,621,523 | A | 4/1997 | Oobayashi et al. |
| 5,706,093 | A * | 1/1998 | Komiya ................. 356/418 |
| 5,786,893 | A | 7/1998 | Fink et al. |
| 5,850,623 | A | 12/1998 | Carman et al. |
| 5,999,259 | A | 12/1999 | Atkinson et al. |
| 6,011,623 | A | 1/2000 | MacDonald et al. |
| 6,141,136 | A | 10/2000 | Kalibjian |
| 6,256,328 | B1 | 7/2001 | Delfyett et al. |
| 6,349,156 | B1 | 2/2002 | OsquoBrien et al. |
| 6,380,531 | B1 | 4/2002 | Sugihwo et al. |
| 6,661,816 | B2 | 12/2003 | Delfyett et al. |
| 6,888,633 | B2 * | 5/2005 | Vander Jagt et al. ......... 356/407 |
| 6,912,052 | B2 | 6/2005 | Rao et al. |
| 7,009,716 | B2 | 3/2006 | Kim et al. |
| 7,292,343 | B2 | 11/2007 | Rao et al. |
| 7,511,749 | B2 * | 3/2009 | Gruhlk et al. ................. 348/272 |
| 2001/0036209 | A1 | 11/2001 | Delfyett |
| 2003/0235924 | A1 | 12/2003 | Adams |
| 2004/0223882 | A1 | 11/2004 | Rhodes |
| 2005/0046856 | A1 | 3/2005 | Rao et al. |

(Continued)

FOREIGN PATENT DOCUMENTS

DE 102005062482 11/2006

(Continued)

*Primary Examiner* — Tu Nguyen

(57) ABSTRACT

A color detector includes a light source, a first filter, and a first photodetector. The light source generates light within a spectrum of wavelengths. The first filter is in optical communication with the light source and is configured to pass light within a first predetermined spectrum of wavelengths. The first photodetector is in optical communication with the first filter and is configured to output a first color signal if light passes through the first filter. The photodetector has an area configured to equalize the first color signal and maximize a signal-to-noise ratio of the first color signal.

16 Claims, 2 Drawing Sheets

U.S. PATENT DOCUMENTS

| | | |
|---|---|---|
| 2005/0046868 A1 | 3/2005 | Kim et al. |
| 2005/0101026 A1 | 5/2005 | Sohn |
| 2005/0142035 A1 | 6/2005 | Shiffer |
| 2005/0174576 A1 | 8/2005 | Rao et al. |
| 2006/0144335 A1 | 7/2006 | Streater |
| 2006/0198404 A1 | 9/2006 | Henrichs |

FOREIGN PATENT DOCUMENTS

| | | |
|---|---|---|
| EP | 0442738 A3 | 9/1990 |
| EP | 0415401 B1 | 3/1991 |
| EP | 0552539 B1 | 7/1993 |
| EP | 0560006 B1 | 9/1993 |
| EP | 0586146 A1 | 3/1994 |
| EP | 0491131 B1 | 7/1995 |
| EP | 0745658 A1 | 12/1996 |
| EP | 0876609 B1 | 11/1998 |
| EP | 0964536 A2 | 12/1999 |
| EP | 0992093 B1 | 5/2003 |
| GB | 02387961 A | 10/2003 |
| GB | 2399875 A1 | 9/2004 |
| GB | 2421738 A | 7/2006 |
| JP | 57042824 | 3/1982 |
| JP | 1982-165724 | 10/1982 |
| JP | 1987-267623 | 11/1987 |
| JP | 01066458 | 3/2001 |
| JP | 03204111 | 7/2003 |
| JP | 03264339 | 9/2003 |
| JP | 03309319 | 10/2003 |
| JP | 04119721 | 4/2004 |
| JP | 04179278 | 6/2004 |
| JP | 04200685 | 7/2004 |
| JP | 05274507 | 10/2005 |
| JP | 06242817 | 9/2006 |
| WO | WO94/24545 A1 | 2/1994 |
| WO | WO 98/41825 | 9/1998 |
| WO | WO99/36788 A1 | 7/1999 |
| WO | WO 00/20844 | 4/2000 |
| WO | WO 2004/063681 A2 | 7/2004 |
| WO | WO 2005/068981 A2 | 7/2005 |
| WO | WO 2006/020702 A2 | 2/2006 |
| WO | WO 2007/027196 A3 | 3/2007 |

\* cited by examiner

COLOR DETECTOR HAVING AREA SCALED PHOTODETECTORS

BACKGROUND

Spectrophotometry is the study of electromagnetic waves in the visible, near-ultraviolet, and near-infrared spectra. A spectrophotometer is a light measuring device that is configured to measure various characteristics of light, including intensity, color, and/or wavelength. Spectrophotometers have a wide range of uses. For instance, they may be used to detect colors on display devices such as televisions, projectors, monitors, and camcorder viewfinders. Alternatively, spectrophotometers may be used in printing devices to calibrate the colors printed.

Typically, when used as a color detector, the spectrophotometer may include a light source, a light-to-electrical transducer, known as a photodetector, and a filter. In one instance, the light is projected toward an object. The object reflects the light, and the photodetector receives the reflected light. The light may pass through the filter before being received by the photodetector so that the color may be detected. Specifically, the filter is configured to only allow light having a specific range of wavelengths to pass through. This is known as filter response. Light that passes through the filter causes the photodetector to generate an electrical signal. The magnitude of this electrical signal indicates the amount of the specific color of light present. An array of photodetectors and filters allow for the spectrophotometer to receive more detailed information. For example, an array of photodetectors each having a filter tuned to filter light at different wavelengths would be able to detect finer resolution on the input light spectrum than a smaller number of filters would.

While useful in many technology areas, spectrophotometers have several problems, especially related to the transmission characteristics of the filter. For instance, in addition to only allowing different colors to pass through them, filters tuned to allow the transmission of light at different frequencies may also allow the transmission of different amounts of light. In other words, the magnitude of light that passes through one filter may be greater than the magnitude of light that passes through another filter. If this difference is a result of the filter configurations, then it may lead to inaccurate color determinations by the color detector if not corrected for. In addition, some filters may exhibit a lower signal-to-noise ratio than other filters due to low input signal strength in that filter bandwidth or the inability of any one filter by its design to allow for a high enough transmission within the band of interest. In this context, "noise" may be light interference from colors outside the filter's tuned spectrum of wavelengths or electrical noise in the photodetector. Attempts to amplify the transmission by the filter may also result in amplifying the noise. Again, this may also lead to inaccurate color determinations by the color detector. Photodetectors may have a different response to a given amount of light power depending on the particular wavelength, i.e. color, of the light that reaches the photodetector. For example, a "red" light could generate an electrical signal that is ten times greater than generated by a "blue" light of equivalent light power. Photodetectors can only detect a limited range of useable light. Light sources may generate a different amount of light as a function of wavelength.

Accordingly, a spectrophotometer or color detector is needed that equalizes the combined light source, filter, and photodetector responses to provide more accurate color determinations by the color detector.

DETAILED DESCRIPTION

A color detector includes a light source configured to generate light within a spectrum of wavelengths. A filter is in optical communication with the light source. The filter is configured to pass light within a first predetermined spectrum of wavelengths. A photodetector is in optical communication with the filter and is configured to output a color signal if light passes through the filter. The strength, i.e. magnitude, of the color signal indicates the amount of light within the first predetermined spectrum of wavelengths is present. The magnitude of the color signal may be dependent upon transmission characteristics of the filter, which may change based on the predetermined spectrum of wavelengths. The filter and photodetector may be used in an array with at least one other filter and photodetector. Each filter in the array may be tuned to allow light of different colors (i.e., spectrum of wavelengths) to pass. Because each filter is tuned to allow a different color to pass, the transmission characteristics of each filter in the array may be different. The sensitivity of each photodetector and the amount of light emitted by the light source may also vary according to color. Accordingly, each color signal generated, for a given input light signal, by each of the photodetectors may have a different magnitude and/or signal-to-noise ratio. This may be corrected by adjusting the area of each of the photodetectors and their corresponding filters. In other words, the photodetectors may have an area configured to equalize the color signal and optimize a signal-to-noise ratio of the color signal. In one embodiment, the signal-to-noise ratio may be optimized for photodetectors by optimizing the signal for a reference color, which in most cases may be a neutral or white color. The area of the photodetector may be based on a response curve of the photodetector as a function of wavelength, a response curve of the filter as a function of wavelength, and a wavelength of the light generated by the light source, among other factors.

In one exemplary approach, the color detector may be used with a printer to calibrate colors printed on a page. Specifically, the color detector may detect the color of the page and/or a test area printed on the page, and the printer may be configured to eject different amounts of ink for different colors of paper to achieve the desired printed color. For example, if yellow ink is desired, but the page is blue, yellow ink will appear green on the page. Therefore, the color detector detects the color of the page and the ink together and configures the printer to eject the ink so that the desired color is shown on the page.

Figure 1:
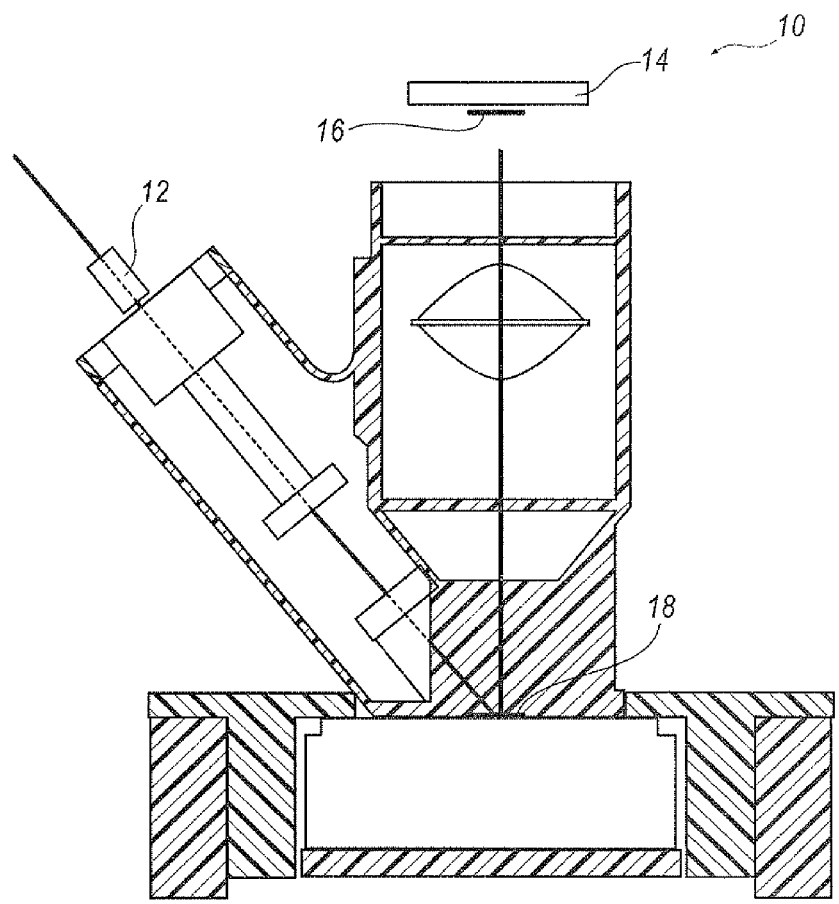
FIG. 1 is cross-sectional side view of an exemplary color detector.

Referring to FIG. 1, an exemplary color detector 10 is provided having a light source 12, a photodetector 14 in optical communication with the light source 12, and a filter 16 spaced from the photodetector 14. In an example of a calibration use, the light source 12 projects light onto a sample 18. The light source 12 may be configured to generate light within a spectrum of wavelengths. In other words, the light source 12 may be configured to generate "white" light or any other color light. The light source 12 may be, for instance, a light emitting diode, although other light sources or combinations of light sources are within the scope of the disclosure. The sample 18 may be, for instance, a piece of paper, although other samples 18 are within the scope of the disclosure. The light projected onto the sample 18 is reflected by the sample 18 onto the photodetector 14. However, before reaching the photodetector 14, in one exemplary approach, the light passes through the filter 16. The filter 16 may be a Fabry-Perot etalon or interferometer, or any other filter 16 known in the art. In one exemplary approach, the filter 16 may be tuned to only allow light having a specific spectrum of wavelengths to pass through to the photodetector 14, as will be discussed in greater detail below. Once received by the photodetector 14, the photodetector 14, a transducer, outputs an electrical signal; this electrical signal is either a current or voltage. The 'photodetector' 14 may be a photodiode, phototransistor, avalanche-photodiode, or any other photodetector 14 known in the art. The magnitude of the output of the photodetector 14 is proportional to the amount of light that reaches the photodetector 14 and thus proportional to the amount of light reaching the corresponding filter 16 that is the color to which the filter 16 is tuned.

Multiple filters 16 may be used with the color detector 10, and each filter 16 may be tuned to a unique specific spectrum of wavelengths. In one exemplary approach, the specific spectrum of wavelengths of each filter 16 may at least partially overlap and may most likely have some transmission at all wavelengths. In other words, each filter is designed to allow a peak or dominant transmission in a specific region. Furthermore, when multiple filters 16 are used, the color detector 10 may include multiple corresponding photodetectors 14—at least one for each filter 16. In one exemplary approach, the color detector 10 may include seven filters 16 and seven photodetectors 14. Each filter 16 may be tuned to allow different colors to pass through to the corresponding photodetector 14. By way of example, the filters 16 may be configured to detect wavelength spectrums corresponding to "red," "orange," "yellow," "green," "blue," "indigo," and "violet." If the sample 18 is in the "red" spectrum, the light will only pass through the filter 16 having wavelengths corresponding to the "red" spectrum, and be blocked by the other filters 16. Therefore, only the photodetector 14 corresponding to the "red" filter 16 will output an electrical signal proportional to the amount of light in the "red" spectrum. Similarly, if the sample 18 is "green," the light will only pass through the filter 16 having wavelengths corresponding to the "green" spectrum, and be blocked by the other filters 16. Therefore, only the photodetector 14 corresponding to the "green" filter 16 will output an electrical signal, proportional to the amount of light in the "green" spectrum. Using more filters 16 and corresponding photodetectors 14 allows the color detector 10 to distinguish between varying hues of color. For instance, with additional filters 16 and corresponding photodetectors 14, the color detector 10 may be able to distinguish between "baby blue," "sky blue," and "navy blue," as opposed to just recognizing the color as being in the "blue" spectrum.

Figure 2:
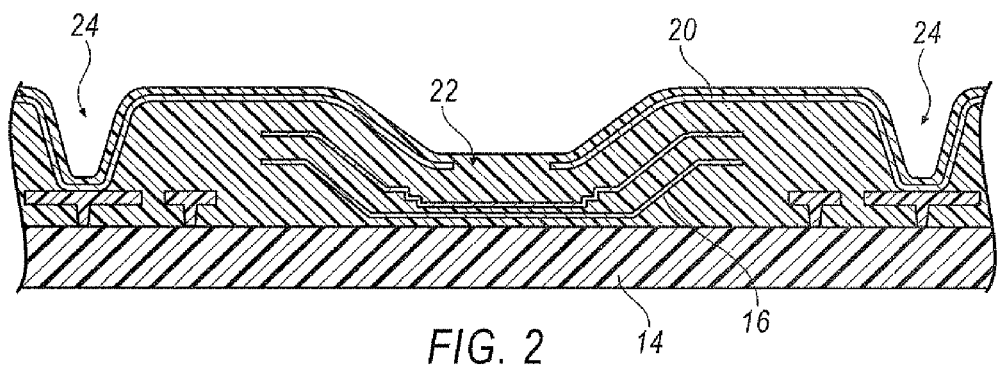
FIG. 2 is a cross-sectional side view of an exemplary filter disposed on an exemplary photodetector.

As discussed in greater detail below, the filter 16 and photodetector 14 may be used in an array with other filters 16 and photodetectors 14. FIG. 2 is an exemplary cross-sectional illustration of one of the filters 16 in the array disposed on one of the photodetectors 14 in the array. When disposed in an array, light may reflect from one filter 16 and interfere with other photodetectors 14 in the array. Therefore, the color detector 10 may include a light blocking layer 20 defining an opening 22 over each filter 16. Light passes through the opening 22 before passing through the filter 16, and the light blocking layer 20 prevents light from reflecting off the filter 16 and interfering with other photodetectors 14. Similarly, the color detector 10 may include at least one trench 24 that also prevents light from interfering with other photodetectors 14.

In one exemplary approach, the filter 16 may include two partially-reflective layers spaced from one another. A spacer layer may be disposed between the first partially reflective layer and the second partially reflective layer. This type of filter 16 may be known in the art as a Fabry-Perot etalon or Fabry-Perot interferometer, although other types of filters 16 may be used. Light may pass through one of the partially reflective layers and reflect between the two partially reflective layers. As illustrated, light may pass through the first partially reflective layer and reflect between the first partially reflective layer and the second partially reflective layer. This is known as internal reflection. If the internal reflections are in phase (i.e., constructive), the light will pass through the filter 16. If the internal reflections are out of phase (i.e., destructive), the light waves will cancel each other out and result in no light passing through the filter 16. Whether the internal reflections are constructive or destructive depends on the wavelength of the light (i.e., the color), the angle of the light entering the filter 16, the thickness of the spacer layer, and the refractive index of the spacer layer. As previously discussed, the color of the light is dependent upon the color of the sample 18. However, the angle of the light entering the filter 16, the thickness of the spacer layer, and the refractive index of the material making up the spacer layer may be adjusted to allow light in a specific spectrum of wavelengths to pass through.

Figure 3:
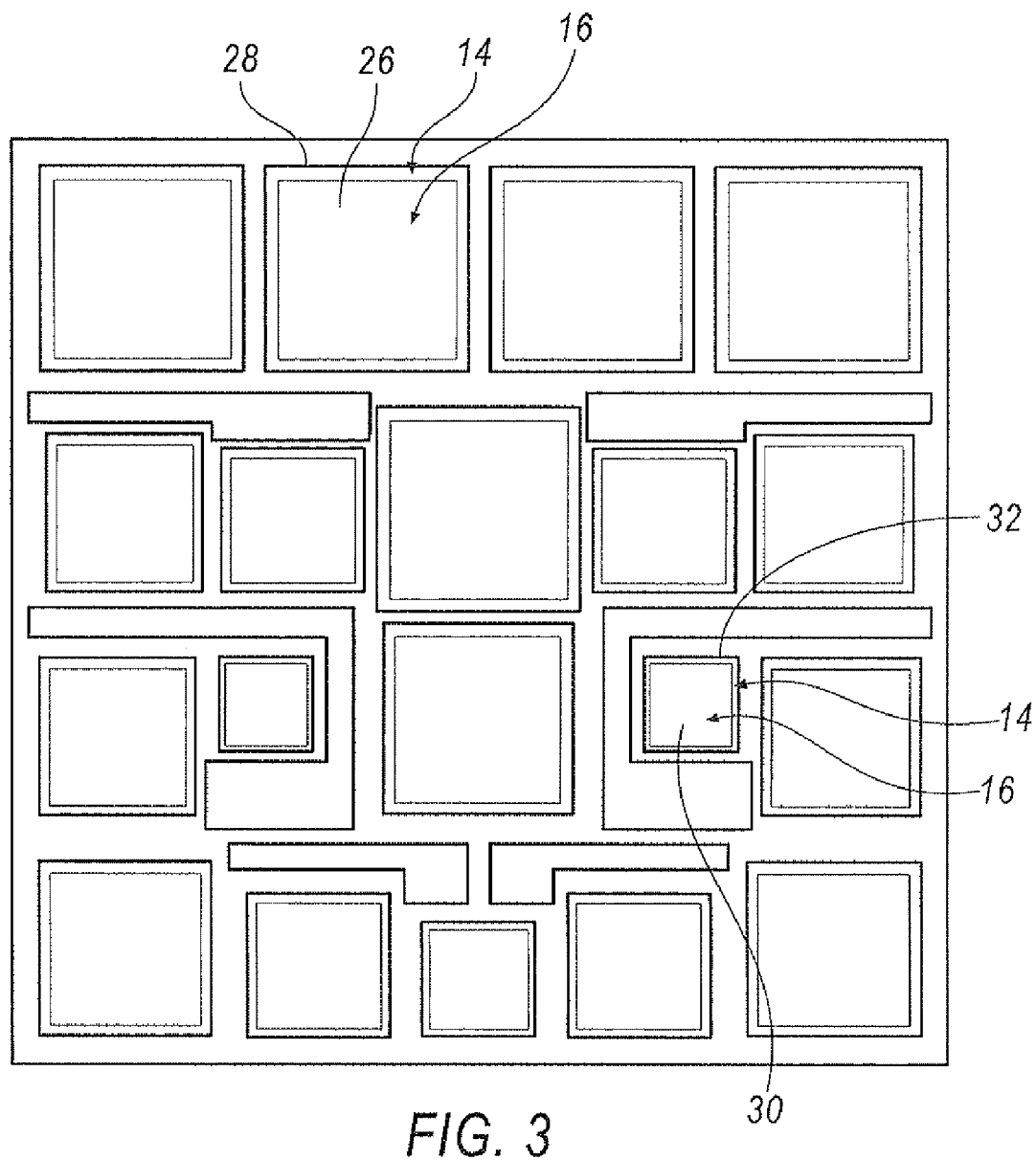
FIG. 3 is an exemplary illustration of the color detector having a plurality of area-scaled filters and photodetectors disposed in an array.

FIG. 3 is an exemplary illustration of the color detector 10 having the array of filters 16 and corresponding photodetectors 14. Although nineteen filters 16 and photodetectors 14 are illustrated, the color detector 10 may include more or less filters 16 and corresponding photodetectors 14. In addition, the filters 16 and photodetectors 14 may be predisposed on an integrated circuit, and one or more of the filters 16 and photodetectors 14 on the integrated circuit may not be used in certain circumstances. For instance, the integrated circuit may include nineteen filters 16 and corresponding photodetectors 14, but only be configured to detect sixteen colors, thus only using sixteen filters 16 and corresponding photodetectors 14.

The color detector 10 may include a first filter 26 in optical communication with the light source 12. The first filter 26 is configured to pass light within a first predetermined spectrum of wavelengths. The first predetermined spectrum of wavelengths is within the spectrum of wavelengths generated by the light source 12. The first filter 26 may be similar to the filters 16 discussed above with reference to FIG. 2. In other words, the first filter 26 may include two partially reflective plates spaced from one another with a spacer layer disposed therebetween.

A first photodetector 28 is in optical communication with the first filter 26 and configured to output a first color signal if light passes through the first filter 26. As previously discussed, the first filter 26 is tuned to allow light within the first predetermined spectrum of wavelengths to pass. In other words, the first filter 26 will let a first color of light through to the first photodetector 28. The first color signal indicates the amount of the first color of light that has been received, indicating the presence of the first color of light in the sample 18. In other words, the first color signal is one of the photodetector electrical output signals discussed above with regard to FIG. 1.

Different color signals have different signal-to-noise ratios. Accordingly, the first photodetector 28 has an area that is configured to equalize the first color signal in relation to other color signals of others filters 14 when used in conjunctions with other filters 14 to measure color as well as to optimize a signal-to-noise ratio of the first color signal for the desired color measurement set. Determining the area of each of the photodetectors 14 may be based on different characteristics of the photodetector 14, the filter 16, or the light source 12. Specifically, the area of the first photodetector 28 may be based on a response curve of the first photodetector 28 as a function of wavelength, a response curve of the first filter 26 as a function of wavelength, or the amount of light as a function of wavelength generated by the light source 12. For instance, light transmission of the first filter 26 may be directly related to the color of light that the first filter 26 is configured to pass. Therefore, some colors of light will have a greater affect on the first photodetector 28 than other colors. Therefore, the size of each photodetector is changed to accommodate for the different light transmission characteristics of each filter 16. Specifically, filters 16 having low light transmission may be disposed on photodetectors 14 having a larger area. With the larger area, the photodetector 14 may receive more of the color, even though the transmission of the color through the filter 16 is low. Likewise, filters 16 having high light transmission may be disposed on photodetectors 14 having a smaller area. With the combination of larger and smaller areas of the photodetectors 14 based on the light transmission through the filter 16, the color output signals of the photodetectors 14 may be equalized. In other words, the design of color detector 10 may balance the light transmission of the filters 16, as well as the response of the photodetector 14 to each of the colors thereby creating equalized color signals of any reference color or optimally equalized color signals for a set of colors. In another embodiment, the photodetectors 14 with different effective areas can be created using different multiples of smaller or unit-sized photodetectors. For example, for the color blue one might use 10 unit-sized photodetectors connected in parallel to form one functional photodetector, while for red, only one unit-sized photodetector may be required.

The color detector 10 may further include a second filter 30 arranged in the array with the first filter 26. The second filter 30 may be in optical communication with the light source 12 and configured to pass light within a second predetermined spectrum of wavelengths. Generally, each filter in the array is specifically designed to be unique in its total wavelength band response. Thus, a given filter may have one dominant transmission peak or multiple but the total transmission characteristic will be different from one filter to another. When filters are used that have only one dominant transmission peak, each dominant peak will cover a different wavelength region than any other filter. When filters need to be used that have multiple peak responses then the response of the two filters that have overlap will differ to some degree in their response in that region of overlap. This ensures that the net wavelength band transmission characteristic is different from one filter to the next.

Often filters will need to be used where some have one dominant peak and others have two dominant peaks. In this situation when filters overlap there will be one dominant peak of one of the filters that does not overlap the dominant peak of the other filter thereby making the net full spectral transmission of the filter unique from the other filters.

A second photodetector 32 is in optical communication with the second filter 30 and may be configured to output a second color signal if light passes through the second filter 30. Like the first photodetector 28, the second photodetector 32 has an area configured to equalize the second color signal and maximize a signal-to-noise ratio of the second color signal. Also, the area of the second photodetector 32 may be based on a response curve of the second photodetector 32 as a function of wavelength, a response curve of the second filter 30 as a function of wavelength, or the amount of light as a function of wavelength generated by the light source 12.

The above description is intended to be illustrative and not restrictive. Many embodiments and applications other than the examples provided would be apparent to those skilled in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A color detector comprising:
   a light source configured to generate light within a spectrum of wavelengths;
   a first filter in optical communication with said light source, wherein said first filter is configured to pass light within a first predetermined spectrum of wavelengths;
   a first photodetector in optical communication with said first filter and configured to output a first color signal if light passes through said first filter; and
   wherein said first photodetector has an area configured to equalize the first color signal and maximize a signal-to-noise ratio of the first color signal.

2. A color detector as set forth in claim 1, wherein said area of said first photodetector is based on at least one of a response curve of said first photodetector as a function of wavelength, a response curve of said first filter as a function of wavelength, and the amount of light as a function of wavelength generated by said light source.

3. A color detector as set forth in claim 1, further comprising a second filter in optical communication with said light source and configured to pass light within a second predetermined spectrum of wavelengths.

4. A color detector as set forth in claim 3, wherein said second predetermined spectrum of wavelengths includes at least one wavelength outside of said first predetermined spectrum of wavelengths.

5. A color detector as set forth in claim 3, wherein said first filter and said second filter are disposed in an array.

6. A color detector as set forth in claim 3, further comprising a second photodetector in optical communication with said second filter and configured to output a second color signal if light passes through said second filter.

7. A color detector as set forth in claim 3, wherein an area of said second photodetector is based on at least one of a response curve of said second photodetector as a function of wavelength, a response curve of said second filter as a function of wavelength, and the amount of light as a function of wavelength generated by said light source.

8. A color detector as set forth in claim 6, wherein said first photodetector is disposed on said first filter and said second photodetector is disposed on said second filter, wherein said first filter and said second filter are disposed in an array.

9. A color detector as set forth in claim 3, wherein said second predetermined spectrum of wavelengths is within said spectrum of wavelengths of the light generated by said light source.

10. A color detector as set forth in claim 1, wherein said first predetermined spectrum of wavelengths is within said spectrum of wavelengths of the light generated by said light source.

11. A color detector as set forth in claim 1, wherein said first filter includes at least two partially reflective plates spaced from one another with a spacer layer disposed therebetween.

12. A color detector comprising:
- a light source configured to generate light within a spectrum of wavelengths;
- a filter array in optical communication with said light source, and wherein each filter in said filter array is configured to pass light within a predetermined spectrum of wavelengths;
- a photodetector array in optical communication with said filter array and configured to output a color signal for each light within said predetermined spectrum of wavelengths that passes through each filter of said filter array; and
- wherein each photodetector in said photodetector array has an area configured to equalize at least one of the plurality of color signals and maximize a signal-to-noise ratio of each of the plurality of color signals.

13. A color detector as set forth in claim 12, wherein said area of each of said photodetectors in said photodetector array is based on at least one of a response curve of each of said photodetectors as a function of wavelength, a response curve of each of said filters as a function of wavelength, and a wavelength of the light generated by said light source.

14. A color detector as set forth in claim 12, wherein said predetermined spectrum of wavelengths is within said spectrum of wavelengths of the light generated by said light source.

15. A color detector as set forth in claim 12, wherein each filter in said filter array is configured to filter at least one unique dominant wavelength in said spectrum of wavelengths.

16. A color detector as set forth in claim 12, wherein each filter in said filter array includes a first partially reflective plate spaced from a second partially reflective plate with a spacer layer disposed therebetween.

* * * * *